(12) United States Patent
Shekhar et al.

(10) Patent No.: US 11,015,404 B1
(45) Date of Patent: May 25, 2021

(54) CUTTINGS VOLUME MEASUREMENT AWAY FROM SHALE SHAKER

(71) Applicant: Halliburton Energy Services, Inc., Houston, TX (US)

(72) Inventors: Prashant Shekhar, Houston, TX (US); Abhijit Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/715,117

(22) Filed: Dec. 16, 2019

(51) Int. Cl.
*E21B 21/06* (2006.01)
*G06K 19/077* (2006.01)
*G01B 11/02* (2006.01)
*G06K 17/00* (2006.01)
*G06T 7/00* (2017.01)

(52) U.S. Cl.
CPC .......... *E21B 21/065* (2013.01); *G01B 11/022* (2013.01); *G06K 17/0025* (2013.01); *G06K 19/07758* (2013.01); *G06T 7/0002* (2013.01)

(58) Field of Classification Search
CPC . E21B 21/065; G01B 11/022; G06K 17/0025; G06K 19/07758; G06T 7/0002
See application file for complete search history.

(56) References Cited

U.S. PATENT DOCUMENTS

| | | | | |
|---|---|---|---|---|
| 5,184,733 | A * | 2/1993 | Arnarson | ............... A22C 25/00 177/1 |
| 6,795,200 | B1 * | 9/2004 | Barman | ............... G01B 11/022 356/606 |
| 10,577,912 | B2 * | 3/2020 | Torrione | ............... E21B 21/065 |
| 2008/0192987 | A1 * | 8/2008 | Helgason | ............... G01N 33/24 382/109 |
| 2013/0228371 | A1 | 9/2013 | Farrar et al. | |
| 2013/0228380 | A1 | 9/2013 | Farrar et al. | |

(Continued)

FOREIGN PATENT DOCUMENTS

| | | |
|---|---|---|
| JP | 09-248529 A | 9/1997 |
| WO | 2017040667 | 3/2017 |
| WO | 2019152950 | 8/2019 |

OTHER PUBLICATIONS

International Search Report and Written Opinion for Application PCT/US2020/013299, dated Sep. 15, 2020.

(Continued)

*Primary Examiner* — Matthew R Buck
(74) *Attorney, Agent, or Firm* — Benjamin Ford; C. Tumey Law Group PLLC

(57) ABSTRACT

A system for measuring drill cuttings may comprise a conveyor belt disposed below a shaker, wherein the shaker disposes the drill cuttings on to the conveyor belt, and an imaging system connected to the conveyor belt by a frame, wherein the frame positions the imaging system to form a field of view on the conveyor belt with the imaging system. The system may further include an information handling system configured to operate the shaker and the conveyor belt. A method for identifying a size of drill cuttings may comprise dropping drill cuttings on a conveyor belt from a shaker, operating the conveyor belt to move the drill cuttings through a field of view, viewing the drill cuttings in the field of view with an imaging system, and sizing the drill cuttings based at least in part on one or more calibration blocks attached to the conveyor belt.

15 Claims, 3 Drawing Sheets

(56) References Cited

U.S. PATENT DOCUMENTS

| | | | | |
|---|---|---|---|---|
| 2014/0046628 A1* | 2/2014 | Ligneul | ................ | G01B 11/02 |
| | | | | 702/158 |
| 2016/0090799 A1 | 3/2016 | Geehan et al. | | |
| 2017/0058620 A1* | 3/2017 | Torrione | ................ | E21B 47/04 |
| 2017/0089153 A1* | 3/2017 | Teodorescu | ............ | G01N 33/24 |
| 2019/0368287 A1 | 12/2019 | Shekhar et al. | | |
| 2019/0368347 A1 | 12/2019 | Kulkarni et al. | | |

OTHER PUBLICATIONS

Schlumberger, Clear, Hole cleaning and wellbore risk reduction service, 2015.

\* cited by examiner

CUTTINGS VOLUME MEASUREMENT AWAY FROM SHALE SHAKER

BACKGROUND

During the drilling of a hydrocarbon-producing well, a drilling fluid or "mud" is continuously circulated from a surface location down to the bottom of the wellbore being drilled and back to the surface again. The returning mud includes drill cuttings derived primarily from the formation being penetrated by a drill bit. In the case of multilateral wells, the drill cuttings may also include metal drill cuttings generated from milling or drilling through casing walls to form a lateral wellbore. Some downhole operations may also include borehole reaming operations, which can result in a unique type of cuttings returning to surface.

Recovery of drill cuttings can be closely monitored during drilling operations. Excessive cuttings, cavings accumulation due to poor hole cleaning, and borehole instability may cause costly stuck pipe incidents. Wellbore instability and stuck pipe incidents can be large contributors to drilling-related non-productive time (NPT). Drilling cuttings/cavings monitoring may be useful for early detection and mitigation of such events.

BRIEF DESCRIPTION OF THE DRAWINGS

The following figures are included to illustrate certain aspects of the present disclosure and should not be viewed as exclusive examples. The subject matter disclosed is capable of considerable modifications, alterations, combinations, and equivalents in form and function, without departing from the scope of this disclosure.

DETAILED DESCRIPTION

The present disclosure is related to wellbore drilling operations and, more particularly, to monitoring drilling fluid returns and adjusting operational parameters of solids-control equipment used to identify the density and/or cuttings size distribution of the wellbore cuttings. As discussed below, the solids control equipment may include at least one shaker, conveyor belt, or actuator table. During operations, drill cuttings suspended within spend drilling fluid may be monitored with one or more cuttings detection devices as the drill cuttings traverse a conveyor belt or actuator table. Data from drill cuttings may then be generated and transmitted to an information handling system where the drill cuttings data is analyzed. Processed drill cuttings data may then be generated and analyzed to determine properties of the cuttings, including, for example, cuttings size distribution and a density of the drill cuttings. Observing characteristic of drill cuttings returning to the surface during drilling operations may increase the effectiveness and efficiency of the drilling operations, which may reduce the cost of drilling wells for oil and gas exploration and subsequent production.

Figure 1:
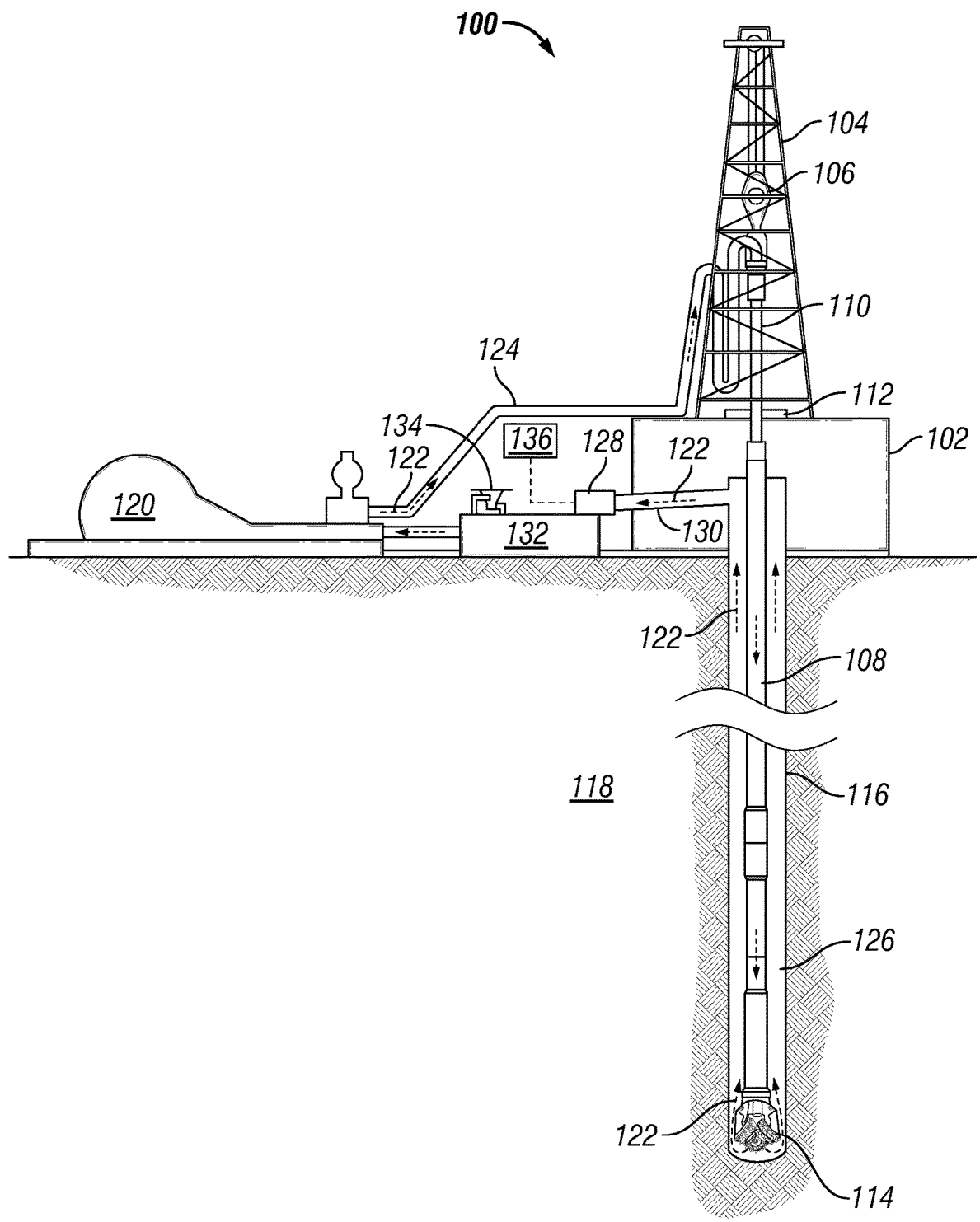
FIG. 1 is a schematic diagram of an exemplary drilling system that may employ the principles of the present disclosure.

FIG. 1 illustrates is an exemplary drilling system 100 that may employ the principles of the present disclosure, according to one or more examples. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. As illustrated, drilling system 100 may include a drilling platform 102 that supports a derrick 104 having a traveling block 106 for raising and lowering a drill string 108. Drill string 108 may include, but is not limited to, drill pipe or coiled tubing, as generally known to those skilled in the art. A kelly 110 supports drill string 108 as it is lowered through a rotary table 112. A drill bit 114 is attached to the distal end of drill string 108 and is driven either by a downhole motor and/or via rotation of drill string 108 by rotary table 112. As drill bit 114 rotates, it creates a borehole 116 that penetrates various subterranean formations 118.

A pump 120 (e.g., a mud pump) circulates drilling fluid 122 through a feed pipe 124 and to kelly 110, which conveys drilling fluid 122 downhole through the interior of drill string 108 and through one or more orifices in drill bit 114. Drilling fluid 122 is then circulated back to the surface via an annulus 126 defined between drill string 108 and the walls of borehole 116. At the surface, the recirculated or spent drilling fluid 122 exits annulus 126 and may be conveyed to one or more fluid processing units, such as solids control equipment 128 via an interconnecting flow line 130.

The returning or spent drilling fluid 122 may contain cuttings and debris derived from borehole 116 as drill bit 114 grinds and scrapes the bottom and walls of borehole 116. The spent drilling fluid 122 may also contain various solid additives, such as lost circulation materials, added to drilling fluid 122 to enhance its operation. After passing through the fluid processing units, including the solids control equipment 128, a "cleaned" drilling fluid 122 may be deposited into a nearby retention pit 132 (i.e., a mud pit or suction tank). One or more chemicals, fluids, or additives may be added to drilling fluid 122 via a mixing hopper 134 communicably coupled to or otherwise in fluid communication with retention pit 132.

Solids control equipment 128 may be configured to substantially remove drill cuttings, solids, and other unwanted debris from drilling fluid 122 and thereby separate waste from reusable particulates or materials. Solids control equipment 128 may include, but is not limited to, one or more shakers (e.g., shale shaker), a desilter, a desander, any combination thereof, and the like (typically solids separation units, based on particle size range). To remove drill cuttings and other unwanted solids from returning drilling fluid 122, shakers used in solids control equipment 128 may include one or more shaker screens (not shown) across which the drill cuttings may traverse to be separated from drilling fluid 122.

A common problem encountered with solids control equipment 128 can be the inefficient removal of unwanted solids and other particulates. For example, when solids control equipment 128, such as shakers, may not be properly tuned, they may sometimes pass unwanted solids or other contaminating particulates into retention pit 132, thereby providing a less effective drilling fluid 122 that is recirculated back into borehole 116. In other cases, un-tuned solids control equipment 128 may inadvertently remove valuable additive components or materials from drilling fluid 122, likewise having an adverse effect on the performance of drilling fluid 122.

In examples, shaker screens used in solids control equipment 128 should be able to handle the full circulation rate of the drilling fluid 122, thereby generating the bulk of drilling waste while simultaneously reclaiming the bulk of drilling fluid 122. Shaker screens may typically be the only equipment that is changed or altered to handle fluctuating deviations in drilling fluid 122 properties, such as changes in flow rate of drilling fluid 122, or drilling conditions, such as the rate of penetration of drill bit 114. Moreover, shaker screens may also typically be the only equipment in conventional drilling systems that separate solids based on size.

As disclosed below, solids control equipment 128 and, more particularly, one or more shakers of solids control equipment 128 may be attached to an imaging system 136 configured to help optimize operating parameters of the shakers. As described herein, imaging system 136 may be configured to provide an operator with a real-time indication of the efficiency of solids control equipment 128, thereby allowing the operator to proactively adjust and otherwise alter one or more operating parameters of solids control equipment 128 (e.g., the shakers) to optimize its operation. Exemplary operating parameters of solids control equipment 128 that may be adjusted may include, but are not limited to, increasing or decreasing an inclination angle (i.e., slope) of a shaker screen, increasing or decreasing a vibration amplitude of a shaker, increasing or decreasing a vibration frequency of a shaker, altering the size (i.e., mesh size) of a shaker screen, altering a configuration or mesh profile (e.g., alternative hole shapes) of a shaker screen, changing the operating speed (i.e., RPM) of a centrifuge, altering the frequency on variable speed drive (VSD) equipment), and any combination thereof.

In examples, imaging system 136 (photo, acoustic, inductive, capacitive etc.) may include or may otherwise be communicably coupled to an automated control system (not shown). When detection limits obtained by imaging system 136 surpass a predetermined operational threshold for drilling fluid 122, the automated control system may be configured to autonomously adjust the one or more operating parameters to bring operation back to suitable operational limits and otherwise optimize operation of solids control equipment 128. Fine-tuning solids control equipment 128 may ensure that drilling fluid 122 is maintained at proper and efficient operating levels. Moreover, when proper solids control practices are utilized, the cost to maintain drilling fluid 122 and related equipment may decrease greatly.

Figure 2:
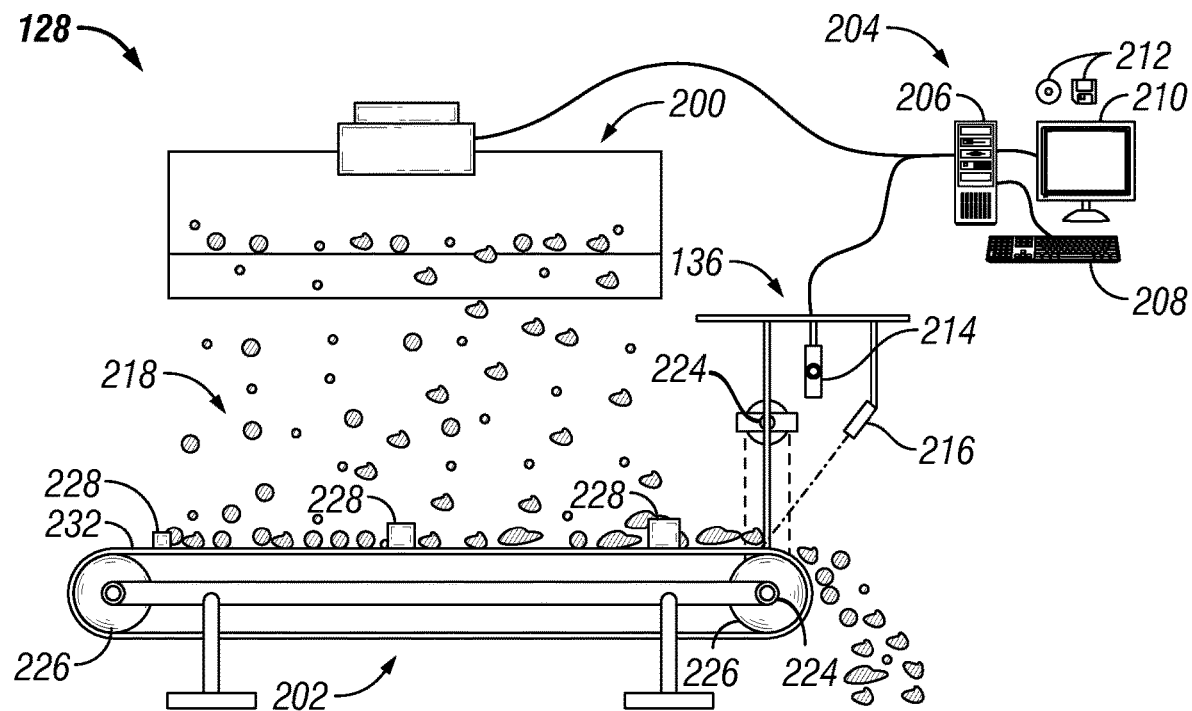
FIG. 2 is a schematic diagram of an example of an imaging system.

FIG. 2 illustrates solids control equipment 128, more specifically a shaker 200, conveyor belt 202, and an imaging system 136 in accordance with some embodiments. As illustrated, solids control equipment 128 may be connected to an information handling system 204. Systems and methods of the present disclosure may be implemented, at least in part, with information handling system 204. Information handling system 204 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 204 may be a processing unit 206, a network storage device, or any other suitable device and may vary in size, shape, performance, functionality, and price. Information handling system 204 may include random access memory (RAM), one or more processing resources such as a central processing unit (CPU) or hardware or software control logic, ROM, and/or other types of nonvolatile memory. Additional components of information handling system 204 may include one or more disk drives, one or more network ports for communication with external devices as well as various input and output (I/O) devices, such as an input device 208 (e.g., keyboard, mouse, etc.) and a video display 210. Information handling system 204 may also include one or more buses operable to transmit communications between the various hardware components.

Alternatively, systems and methods of the present disclosure may be implemented, at least in part, with non-transitory computer-readable media 212. Non-transitory computer-readable media 212 may include any instrumentality or aggregation of instrumentalities that may retain data and/or instructions for a period of time. Non-transitory computer-readable media 212 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

During operations, information from solids control equipment 128 may be gathered and/or processed by information handling system 204. For example, information recorded by imaging system 136 may be stored on memory and then processed by information handling system 204. The processing may be performed real-time during data acquisition. Without limitation, information from imaging system 136 may be processed by information handling system 204, which may then control shaker 200 and conveyor belt 202 based at least in part on the information processed from imaging system 136. Processed information may therein be displayed for personnel to observe and stored for future processing and reference.

It should be noted, however, that imaging system 136 schematically depicted in FIG. 2 is only an example of one type of imaging system, device, or apparatus that may be used in keeping with the principles of the present disclosure. Indeed, other types and configurations of imaging systems that incorporate other computer design configurations may alternatively and suitably incorporate the principles of the present disclosure, without departing from the scope of the disclosure. Accordingly, the following description of the imaging system 136 is provided for illustrative purposes only and should not be considered limiting.

In examples, imaging system 136 may be located on or near the drilling platform 102 (e.g., referring to FIG. 1). In other examples, however, any of the component parts or modules shown in FIG. 2 may be located at a remote location, without departing from the scope of the disclosure. For instance, some of the data and processing modules of imaging system 136 may be located at a remote operation center, where the data could be received and analyzed by a geologist, a mud logger, or another type of logging professional. In addition, the remote location may include a mobile device, such as a tablet or handheld computer, and the data and/or resulting computational analysis may be transmitted via a data delivery system, or via any other mobile transfer standard utilized in the industry.

Figure 3:
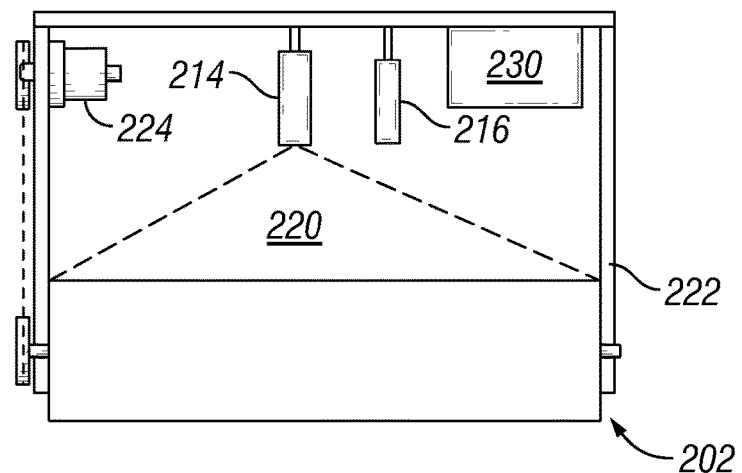
FIG. 3 is a front view of the imaging system.

As illustrated, imaging system 136 may include one or more cuttings (or solids) detection devices communicably coupled to and otherwise in communication with information handling system 204. As illustrated in FIGS. 2 and 3, detection devices may be a camera 214 and a laser 216 in accordance with some embodiments. Camera 214 and laser 216 may be positioned adjacent, above, to the side, and/or the like of conveyor belt 202. Camera 214 and a laser 216 may be configured to monitor drill cuttings 218 as they move with conveyor belt 202.

In examples, camera 214 may be a high-speed camera capable of capturing images and/or video of drill cuttings 218 in real-time or at timed intervals dependent upon the drilling operation (e.g., drilling, circulating, cleaning, etc.). Camera 214, for instance, may include one or more charge coupled device (CCD) cameras, one or more low light or infrared cameras, a 3D laser scanner, a conoscopic holography camera, a coherent laser radar, one or more touch probes, a magnetic position tracker, or any combination thereof. In at least one example, camera 214 may include a high-speed microscope. Additionally, camera 214 may be configured to be used in conjunction with one or more light sources, such as a white light source, an incandescent light source (e.g., a tungsten filament light bulb), an infrared light source, laser 216, one or more light emitting diodes (LEDs), or any combination thereof.

As illustrated in FIGS. 2 and 3, laser 216 may be used as a light source, which may illuminate drill cuttings 218 with a known wavelength of electromagnetic radiation in accordance with some embodiments. As a result, drilling fluid 122 (e.g., referring to FIG. 1) and various additives suspended therein (e.g., lost circulation materials, etc.) may become relatively transparent in contrast to the adjacent drill cuttings 218 such that only drill cuttings 218 may be visible for image capture. In some examples, one or more energy modification devices (not shown), such as a polarizer, a beam splitter, and/or a filter may interpose drill cuttings 218 to reduce the number or breadth of wavelengths seen by camera 214. For instance, a polarizer may be used to align light energy in either the 'P' or 'S' directions (so that the processed energy is p-polarized, or s-polarized), or to generate a blend of P and S polarized energy. A beam splitter may be used to reduce the spectrum of the received energy to some selected or preferred range of wavelengths. Lastly, a filter may be used to further narrow the range to a select spectrum prior to image detection.

As illustrated in FIG. 3, camera 214 and laser 216 may be configured to illuminate drill cuttings 218 (e.g., referring to FIG. 2) in a field of view 220 on conveyor belt 202. As illustrated, a frame 222 may support camera 214 and laser 216, which may help in processing drill cuttings 218. Processing drill cutting 218 may result in the determination of various characteristics of drill cuttings 218, such as cuttings size distribution or density of the drill cuttings 218 traversing conveyor belt 202. As used herein, the "density" of drill cuttings 218 refers to the amount of drill cuttings 218 traveling on conveyor belt 202 over a certain time period or, in other words, flow rate of drill cuttings 218. Upon receiving the image data derived from camera 214, a software program stored in processing unit 206 may be programmed with instructions that, when executed by a processor(s) in processing unit 206, perform desired measurements or analysis on drill cuttings 218 to determine cuttings size distribution and/or density of drill cuttings 218. In an example, the software may include a three-dimensional (3D) face recognition program or particle size analysis program to measure and determine the desired characteristics of drill cuttings 218. Drill cuttings 218 may be analyzed in real-time by the software to determine the real-time cuttings size distribution and/or density of drill cuttings 218 traveling on conveyor belt 202.

With continued reference to FIGS. 2 and 3 conveyor belt 202 may be placed underneath shaker 200 where drill cuttings 218 may fall from shaker 200 on to conveyor belt 202. The length and width of the shaker screen may be customized per operational needs. In examples, conveyor belt 202 may be mounted on a grating where drill cuttings 218 may fall on conveyor belt 202, which may carry drill cuttings 218 over to the edge of conveyor belt 202. Additionally, conveyor belt 202 may be driven by one or more motors 224 (electric or Pneumatic). Various types of motors 224 may be considered such as AC motors, DC Motors, Servo motors, Stepper Motors etc. For electric motors, junction boxes may be needed to provide power and capture signals. Additionally, motor 224 and conveyor rollers 226 may be connected by various options such as gear arrangement, chains, and/or sprockets. Motors 224 may move a track 232, which may also be identified as a belt, in which drill cuttings 218 may be disposed on. Track 232 may move based at least in part on gear arrangements, sprockets, and one or more motors 224. Additionally, track 232 may include an oleo phobic or hydrophobic coating, which may prevent drill cuttings 218 from sticking the surface of track 232, which may skew measurements.

During operations, the speed of conveyor belt 202 may be easily determined as well as controlled for a particular RPM of motor 224. Speed of conveyor belt 202 may be controlled by information handling system 204, which may be based at least in part on information from imaging system 136. For example, conveyor belt 202 may speed up or slow down based on the number of drill cuttings 218 passing through field of view 220 of imaging system 136. Additionally motor 224 may have an RPM sensor to produce a feedback signal. The speed of motor 224 may be changed electronically and remotely from information handling system 204 based on the feedback signal from the RPM sensor and/or the size and number of drill cuttings 218.

To determine the size of drill cuttings 218, imaging system 136 may be calibrated to identify the different sizes of drill cuttings 218. As illustrated in FIG. 2, this calibration may be performed automatically using calibration blocks 228. In one or more examples, there may be any number of calibration blocks 228 attached to conveyor belt 202. Each calibration block 228 may be a different size. Additionally, each calibration block 228 may include a radio frequency identification (RFID) tag that may identify each calibration block 228 individually and the size of the calibration block 228. During calibration operations, information handling system 204 may activate auto flushing mechanisms, not illustrated, which may clean conveyor belt 202, which may leave each calibration block 228 exposed. Thus, when a calibration block 228 passes over field of view 220 (e.g., referring to FIG. 3), the particular size of calibration block 228 is captured and recorded. This size is identified by the RFID tag on calibration block 228. A RFID transmitter 230 (e.g., referring to FIG. 3) may operate and function to identify the RFID tag. Additionally, size calibration may be performed in one rotation of conveyor belt 202. The speed of conveyor belt 202 may be varied to accommodate imaging system 136 during the calibration mode.

Figure 4:
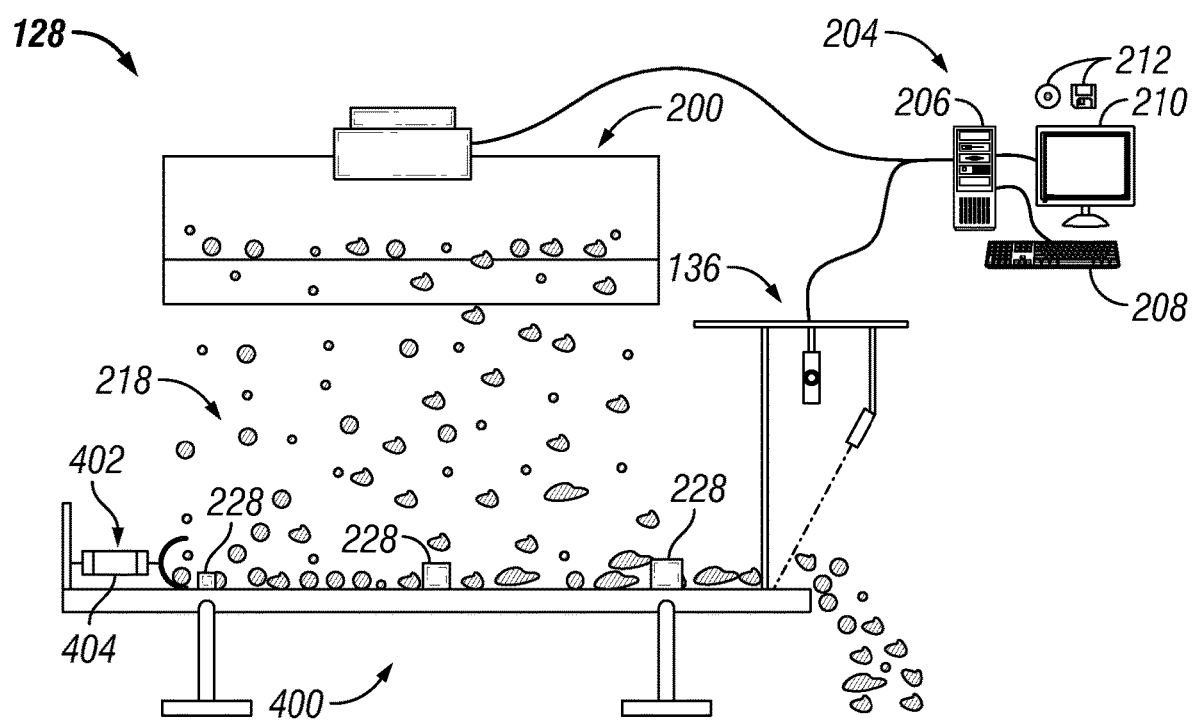
FIG. 4 is a schematic diagram of another example of the imaging system.

FIG. 4 illustrates another example of illustrates solids control equipment 128, which includes an actuator table 400, a shaker 200, and an imaging system 136. As illustrated in FIG. 4, actuator table 400 may be disposed underneath shaker 200 from which drill cuttings 218 may fall from. As illustrated, actuator table 400 may include an actuator system 402 and one or more calibration block 228, which may include RFID tags as discussed above. Actuator system 402 may include a plunger 404, which may also be identified as a cylinder. Plunger 404 may be pneumatic, electric, or hydraulic.

During operations, shaker 200 may release a pre-determined amount of of drill cuttings 218 on actuator table 400. After releasing drill cuttings 218, shaker 200 may stop, which may allow imagining system 136 to scan actuator table 400 and drill cuttings 218 on actuator table 400. The size of drill cuttings 218 may be determined from imaging system 136, which has been calibrated using calibration blocks 228 as described above. After scanning drill cuttings 218, actuator system 402 may extend plunger 404 across the length of actuator table 400, which may remove drill cuttings 218 from actuator table 400 and a new batch of drill cuttings 218 may be release from shaker 200.

Accordingly, the systems and methods disclosed herein may be directed to a method for receiving measurement data from a remote wireline system. The systems and methods may include any of the various features of the systems and methods disclosed herein, including one or more of the following statements.

Statement 1: A system for measuring drill cuttings may comprise a conveyor belt disposed below a shaker, wherein the shaker disposes the drill cuttings on to the conveyor belt, and an imaging system connected to the conveyor belt by a frame, wherein the frame positions the imaging system to form a field of view on the conveyor belt with the imaging system. The system may further include an information handling system configured to operate the shaker and the conveyor belt.

Statement 2: The system of statement 1, wherein the imaging system comprises a camera and a laser, wherein the camera is configured to measure a size of the drill cuttings.

Statement 3. The system of statements 1 or 2, further comprising one or more calibration blocks, wherein the one or more calibration blocks are different sizes.

Statement 4. The system of statement 3, wherein the one or more calibration blocks are attached to the conveyor belt and include a radio frequency identification (RFID) tag.

Statement 5. The system of statement 4, further comprising an RFID transmitter, connected to the frame, that is configured to read the RFID tags.

Statement 6. The system of statements 1-3, further comprising one or more motors, wherein the one or more motors are connected to the conveyor belt and are configured to operate the conveyor belt.

Statement 7. The system of statement 6, wherein the information handling system is further configured to operate the one or more motors based at least in part on information from the imaging system.

Statement 8. A system for measuring drill cuttings may comprise an actuator table disposed below a shaker, wherein the shaker disposes the drill cuttings on to the actuator table, and an imaging system connected to the actuator table by a frame, wherein the frame positions the imaging system to form a field of view on the actuator table with the imaging system. The system may further include an information handling system configured to operate the shaker and the actuator table.

Statement 9, The system of statement 8, wherein the imaging system comprises a camera and a laser, wherein the camera is configured to measure a size of the drill cuttings.

Statement 10. The system of statements 8 or 9, further comprising one or more calibration blocks, wherein the one or more calibration blocks are different sizes.

Statement 11. The system of statement 10, wherein the one or more calibration blocks are attached to the actuator table and include an RFID tag.

Statement 12. The system of statement 11, further comprising an RFID transmitter, connected to the frame, that is configured to read the RFID tags.

Statement 13. The system of statements 8-10, further comprising an actuator system attached to the actuator table, wherein the actuator system includes a plunger.

Statement 14. The system of statement 13, wherein the information handling system is further configured to operate the actuator system based at least in part on information from the imaging system.

Statement 15. A method for identifying a size of drill cuttings may comprise dropping drill cuttings on a conveyor belt from a shaker, operating the conveyor belt to move the drill cuttings through a field of view, viewing the drill cuttings in the field of view with an imaging system, and sizing the drill cuttings based at least in part on one or more calibration blocks attached to the conveyor belt.

Statement 16. The method of statement 15, wherein the imaging system comprises a camera and a laser.

Statement 17. The method of statements 15 or 16, wherein the one or more calibration blocks comprise an RFID tag.

Statement 18. The method of statement 17, further comprising identifying the one or more calibration blocks through the RFID tag with an RFID transmitter.

Statement 19. The method of statements 15-17, further comprising controlling a speed of the conveyor belt with an information handling system.

Statement 20. The method of statement 19, wherein the speed of the conveyor belt is based at least in part on the drill cuttings within the field of view.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for measuring drill cuttings, comprising:
   a conveyor belt disposed below a shaker, wherein the shaker disposes the drill cuttings on to the conveyor belt;
   an imaging system including one or more cuttings or solids detection devices, the imaging system connected to the conveyor belt by a frame, wherein the frame positions the imaging system to form a field of view on the conveyor belt with the imaging system;
   an information handling system communicably coupled with the imaging system and a solids control equipment to operate the shaker and the conveyor belt; and
   one or more calibration blocks, wherein the one or more calibration blocks are different sizes and wherein the one or more calibration blocks are attached to the conveyor belt and include a radio frequency identification (RFID) tag.

2. The system of claim 1, wherein the imaging system comprises a camera and a laser, wherein the camera is configured to measure a size of the drill cuttings.

3. The system of claim 1, further comprising an RFID transmitter, connected to the frame, that is configured to read the RFID tags.

4. The system of claim 1, further comprising one or more motors, wherein the one or more motors are connected to the conveyor belt and are configured to operate the conveyor belt.

5. The system of claim 4, wherein the information handling system is further configured to operate the one or more motors based at least in part on information from the imaging system.

6. A system for measuring drill cuttings, comprising:
   an actuator table disposed below a shaker, wherein the shaker disposes the drill cuttings on to the actuator table;
   an imaging system connected to the actuator table by a frame, wherein the frame positions the imaging system to form a field of view on the actuator table with the imaging system;
   an information handling system configured to operate the shaker and the actuator table and
   one or more calibration blocks, wherein the one or more calibration blocks are different sizes, wherein the one or more calibration blocks are attached to the actuator table and include an RFID tag.

7. The system of claim 6, wherein the imaging system comprises a camera and a laser, wherein the camera is configured to measure a size of the drill cuttings.

8. The system of claim 6, further comprising an RFID transmitter, connected to the frame, that is configured to read the RFID tags.

9. The system of claim 6, further comprising an actuator system attached to the actuator table, wherein the actuator system includes a plunger.

10. The system of claim 9, wherein the information handling system is further configured to operate the actuator system based at least in part on information from the imaging system.

11. A method for identifying a size of drill cuttings comprising:
    dropping drill cuttings on a conveyor belt from a shaker;
    operating the conveyor belt to move the drill cuttings through a field of view;
    viewing the drill cuttings in the field of view with an imaging system; and
    sizing the drill cuttings based at least in part on one or more calibration blocks attached to the conveyor belt, wherein the one or more calibration blocks comprise an RFID tag.

12. The method of claim 11, wherein the imaging system comprises a camera and a laser.

13. The method of claim 11, further comprising identifying the one or more calibration blocks through the RFID tag with an RFID transmitter.

14. The method of claim 11, further comprising controlling a speed of the conveyor belt with an information handling system.

15. The method of claim 14, wherein the speed of the conveyor belt is based at least in part on the drill cuttings within the field of v.

* * * * *

UNITED STATES PATENT AND TRADEMARK OFFICE
CERTIFICATE OF CORRECTION

PATENT NO. : 11,015,404 B1
APPLICATION NO. : 16/715117
DATED : May 25, 2021
INVENTOR(S) : Prashant Shekhar and Abhijit Kulkarni Page 1 of 1

It is certified that error appears in the above-identified patent and that said Letters Patent is hereby corrected as shown below:

In the Claims

Column 10 Lines 10-11, Claim 6 from "the shaker and the actuator table and one or more calibration blocks" to --the shaker and the actuator table; and one or more calibration blocks--.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*